United States Patent
Bocquet et al.

(10) Patent No.: US 9,564,652 B2
(45) Date of Patent: Feb. 7, 2017

(54) METHOD AND DEVICE FOR PRODUCING ENERGY

(71) Applicants: UNIVERSITE CLAUDE BERNARD LYON I, Villeurbanne (FR); CENTRE NATIONAL DE LA RECHERCHE SCIENTIFIQUE, Paris (FR)

(72) Inventors: Lyderic Bocquet, Lyon (FR); Anne-laure Biance, Lyon (FR); Philippe Poncharal, Chazay D'azergues (FR); Alessandro Siria, Lyon (FR)

(73) Assignees: UNIVERSITE CLAUDE BERNARD LYON I, Villeurbanne (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 14/433,109

(22) PCT Filed: Oct. 14, 2013

(86) PCT No.: PCT/FR2013/052442
§ 371 (c)(1),
(2) Date: Apr. 2, 2015

(87) PCT Pub. No.: WO2014/060690
PCT Pub. Date: Apr. 24, 2014

(65) Prior Publication Data
US 2015/0249255 A1    Sep. 3, 2015

(30) Foreign Application Priority Data
Oct. 16, 2012  (FR) ..................... 12 59847

(51) Int. Cl.
*H01M 8/10* (2016.01)
*F03G 7/00* (2006.01)
*H01M 8/22* (2006.01)
*B01D 61/46* (2006.01)

(52) U.S. Cl.
CPC .......... *H01M 8/1009* (2013.01); *B01D 61/46* (2013.01); *F03G 7/005* (2013.01); *H01M 8/227* (2013.01); *Y02E 60/50* (2013.01)

(58) Field of Classification Search
CPC ...... B01D 61/46; Y02E 60/50; H01M 8/1009; H01M 8/227
See application file for complete search history.

(56) References Cited

U.S. PATENT DOCUMENTS

| | | | |
|---|---|---|---|
| 4,283,913 A | 8/1981 | Loeb | |
| 2005/0175894 A1* | 8/2005 | Visco | .......... H01M 2/1673 429/212 |

(Continued)

FOREIGN PATENT DOCUMENTS

| | | |
|---|---|---|
| EP | 1746680 A1 | 1/2007 |
| WO | 2007025104 A2 | 3/2007 |

(Continued)

OTHER PUBLICATIONS

International Search Report mailed Jan. 23, 2014, corresponding to International Patent Application No. PCT/FR2013/052442.

(Continued)

*Primary Examiner* — Emily Le
*Assistant Examiner* — Monique Wills
(74) *Attorney, Agent, or Firm* — Ladas & Parry LLP

(57) ABSTRACT

The present invention concerns a device for producing electrical energy comprising two cells intended to contain two solutions of different concentrations of at least one solute and separated by at least one separation membrane in which channels are arranged, each of the cells being provided with an electrode intended to be in contact with the solution that said cell will contain, characterized in that the walls of the channels consist of a material chosen from boron nitride, carbon doped with boron, boron nitride doped (Continued)

with carbon, or any other mixture of the elements boron, carbon and nitrogen, and a method for producing electrical energy that implements such a device.

20 Claims, 3 Drawing Sheets

(56) References Cited

U.S. PATENT DOCUMENTS

| | | |
|---|---|---|
| 2009/0321355 A1 | 12/2009 | Ratto et al. |
| 2011/0186506 A1 | 8/2011 | Ratto et al. |
| 2012/0080381 A1 | 4/2012 | Wang et al. |
| 2014/0262820 A1* | 9/2014 | Kuan .................. C25F 3/14 205/665 |
| 2015/0155727 A1* | 6/2015 | Chang .................. H01M 8/188 324/426 |

FOREIGN PATENT DOCUMENTS

| | | |
|---|---|---|
| WO | 2008108633 A1 | 9/2008 |
| WO | 2009129354 A2 | 10/2009 |
| WO | 2010120327 A1 | 10/2010 |
| WO | 2012047359 A1 | 4/2012 |

OTHER PUBLICATIONS

J. C. Fair et al., Reverse Electrodialysis in Charged Capillary Membranes, The Journal of Chemical Physics, Apr. 15, 1971, 54(8), 3307-3316.

Jan W. Post et al., Energy Recovery from Controlled Mixing Salt and Fresh Water with a Reverse Electrodialysis System, Environ Sci. Technol. 2008, 42, 5785-5790.

B. E. Logan et al, Membrane-based processes for sustainable power generation using water, Nature, Aug. 16, 2012, vol. 488, 313-319 (2012).

Dong-Kwon Kim et al., Power generation from concentration gradient by reverse electrodialysis in ion-selective nanochannels, Microfluid Nanofluid, 9:1215-1224, 2010.

R. Arenal et al., Boron-nitride and boron-carbonitride nanotubes: synthesis, characterization and theory, Advances in Physics, 59, 101-179 (2010).

Mikhael Bechelany, et al., Synthesis of Boron Nitride Nanotubes by a Template-Assisted Polymer Thermolysis Process, J. Phys. Chem. C. 2007, 111, 13378-13384.

Jason K. Holt, et al., Fast Mass Transport Through Sub-2-Nanometer Carbon Nanotubes, Science, May 19, 2006, vol. 312, p. 1034-1037.

Derek Stein, et al., Surface-Charge-Governed Ion Transport in Nanofluidic Channels, Phys. Rev. Lett., Jul. 16, 2004, vol. 93, No. 3, p. 03590-1-035901-4.

Haitao Liu, et al., Translocation of Single-Stranded DNA Through Single-Walled Carbon Nanotubes, Science, Jan. 1, 2010, vol. 327, 64-67.

Lyderic Bocquet, et al., Nanofluidics, from bulk to interfaces, Chem. Soc. Rev., 39, 1073-1095 (2010).

* cited by examiner

METHOD AND DEVICE FOR PRODUCING ENERGY

This application is a 371 of PCT/FR2013/052442, filed on Oct. 14, 2013, which claims priority to French Application No. 1259847 filed Oct. 16, 2012.

The present invention relates to the technical field for producing energy. More specifically, the present invention relates to a method and to a device for producing electric energy, from a concentration gradient applying a particular membrane.

Various projects have studied different approaches attempting to utilize osmosis and electrodialysis phenomena for attempting to recover the energy generated by concentration gradients or saline gradients. For this, two solutions of different concentrations of a salt or solute are positioned on either side of a membrane. The concentration gradient causes diffusion of one of the solutions through the membrane, which may lead to generation of energy. Reference may notably be made to the studies of J. C. Fair et al., The Journal of Chemical Physics, 54(8), 3307-3316, 1971, Jan W. Post et al., Environ Sci. Technol. 2008, 42, 5785-5790, 2008 and Bruce E. Logan et al., Nature, 488, 313-319, 2012 who studied reverse electrodialysis (RED). Membranes of the polymeric type, notably of polyamide or cellulose-acetate were used for this type of applications. The use of membranes including channels, the surface of which is of an inorganic nature was also contemplated, which, when the latter are filled with an aqueous solution, causes surface ionization, an adsorption of ions and dissolution of ions (Dong-Kwon Kim et al., Microfluid nanofluid, 9, 1215-1224, 2010). Unfortunately, the energy production with the proposed devices remains up to now limited to a few watts per square meter of membrane, which is not practically utilizable. For example, the use of a silica membrane having nanochannels did not give the possibility of obtaining superior results to what was obtained with polymeric membranes (Dong-Kwon Kim et al., Microfluid nanofluid, 9, 1215-1224, 2010).

In this context, the present invention proposes providing a novel device and a novel method adapted for producing electric energy which are non-polluting, easy to apply, relatively economical and which provide many possibilities for producing renewable energy.

Another object of the present invention is to provide a method and a device which may be more performing, notably in terms of generated energy density.

Thus, the object of the present invention is a device for producing electric energy comprising two cells intended to contain two solutions of different concentration of at least one solute and separated by at least one separation membrane in which channels are arranged, each of the cells being equipped with an electrode intended to be in contact with the solution which said cell will contain, characterized in that the internal walls of the channels consist of a material selected from boron nitride, carbon doped with boron, boron nitride doped with carbon, or any other mixture of the boron, carbon and nitrogen elements. Within the scope of the invention, boron nitride is the preferred material for forming the walls of the channels for letting through the solution.

The object of the invention is also a method for producing electric energy using a device according to the invention, wherein a first solution is placed in one of the cells, so that the electrode with which it is equipped is in contact with this first solution, and a second solution having a concentration of at least one solute, different from that of the first solution, is placed in the other cell, so that the electrode with which it is equipped is in contact with this second solution and wherein the produced electric energy between both electrodes is recovered.

The devices and methods according to the invention will be discussed in more detail in the description which follows with reference to the appended FIGS. 1 to 3 which illustrate examples of a device according to the invention.

Figure 1:
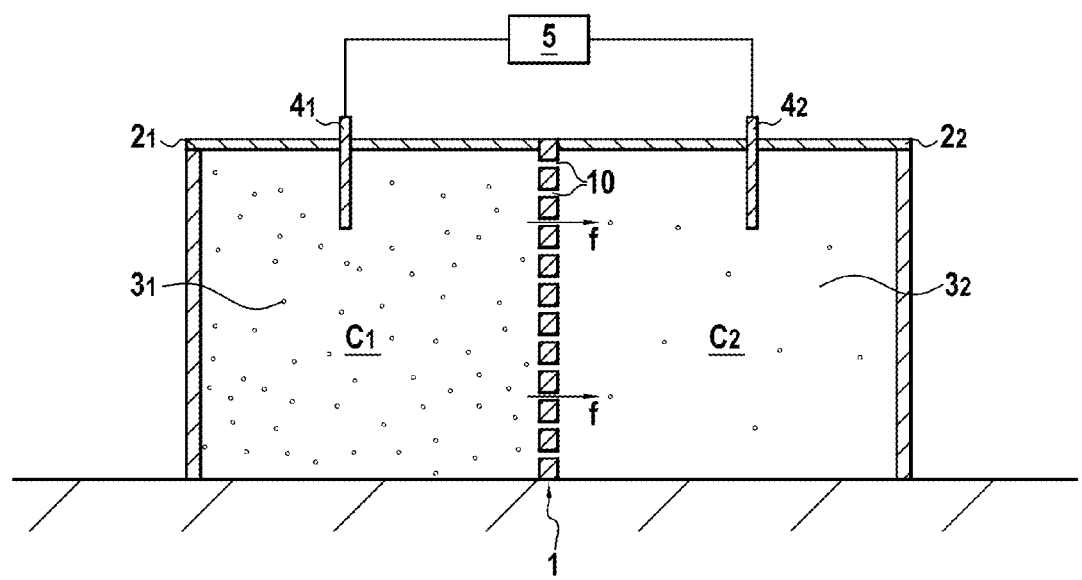
FIGS. 1 and 3 are schematic sectional views of devices according to the invention.

FIG. 1 schematically shows an exemplary device according to the invention comprising two cells $2_1$ and $2_2$ separated by a membrane 1. Each cell contains a solution $3_1$ and $3_2$ in which is immersed an electrode $4_1$ and $4_2$. In the illustrated example, the electrodes are partly immersed in solutions, but it might also be provided that the electrodes appear as a plate positioned against, or forming at least partly a cell wall. Within the scope of the invention, the membrane 1 separating both cells $2_1$ and $2_2$ forms a separation wall between both solutions $3_1$ and $3_2$, placed between both cells $2_1$ and $2_2$, but passages 10 are arranged therein in order to allow diffusion of a solution from one cell to the other. Indeed, the concentration difference of at least one of the solutes dissolved in at least one of the solutions causes an osmotic pressure difference which generates a displacement of one of the solutions through the membrane. In the illustrated example, the solution $3_1$ has a concentration $C_1$ of a solute greater than the concentration $C_2$ of the same solute in the solution $3_2$. A flow f of solution from cell $2_1$ to cell $2_2$ is thus generated. This concentration difference generates electric energy, notably as a current, generated by osmosis through the diffusion channels. The phenomenon used is known as reverse electrodialysis (J. C. Fair et al., 1971, supra, Jan W. Post et al., 2008 supra and Bruce E. Logan et al., 2012 supra).

Because of the selection of the material making up the walls of the channels for letting through the solution, when the latter are filled with solution, and in particular with an aqueous solution, charges are generated on the walls of the channels which will be carried away with the solution, thereby allowing generation of a particularly high electric energy between both electrodes. It was totally unpredictable that the selection of channels delimited by walls formed of a material selected from boron nitride, carbon doped with boron, boron nitride doped with carbon, or any other mixture of the boron, carbon and nitrogen elements, would give the possibility of obtaining such an effect which is much greater than what was described in the literature, for example, with polymeric membranes or membranes incorporating channels made in a silica membrane (Dong-Kwon Kim et al., 2010, supra). Indeed, the chemical reactivity of BN, notably is rather known as being weak or inexistent. This type of material was therefore expected to be chemically inert (R. Arenal, X. Blasé, A. Loiseau, Advances in Physics, 59, 101-179 (2010)).

Figure 2:
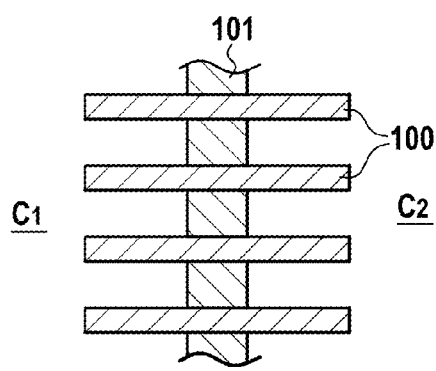
FIG. 2 is a partial schematic sectional view of a membrane which may be used.

The channels may be made as holes in a wall formed with one of the selected materials, such as for example as illustrated in FIG. 1. It may also be provided that the channels are made as holes in a wall formed in another material and that the walls of the holes are covered by the selected material, according to any suitable technique. Nevertheless, for reasons of feasibility and cost, it will be preferred that the channels be formed with tubes of the selected material with a suitable size. Preferably, these tubes will be positioned parallel with each other as illustrated in FIG. 2. These tubes may be inserted into a wall or plate pierced beforehand and the seal around the tube may be made by one skilled in the art with any suitable means. FIG. 2 schematically shows such a membrane in which a series of tubes 100 is inserted into the holes of a plate 101. Such a plate may for example consist in a material such as silica, silicon nitride, aluminate, carbon, naphthalene or any other solute-tight amorphous material. Such membranes incorporating boron nitride nanotubes are notably described in J. Phys. Chem. C. 2007, 111, 13378-13384 and may be used within the scope of the invention. For preparing the other types of nanotubes which may be integrated into a membrane, reference may be made to Holt, et al. Science 2006, 312, p 1034. Generally, whether this is in the form of a deposit or of a nanotube, boron nitride, carbon doped with boron, doped boron nitride with carbon or any other mixture of the boron, carbon and nitrogen elements may for example be obtained with a Chemical Vapor Deposition (CVD) method (e.g. R. D. Gretz et al., Surface Science, 1967, 6 p 171), notably plasma-assisted, the sample may be directly exposed to a PECVD plasma (Plasma-Enhanced CVD, e.g. L. Bardos et al., Journal Of Physics D—Applied Physics, 1982, 15 L79-L82), or held away from the RPECVD plasma (Remote Plasma-Enhanced CVD, e.g. D. V. Tsu and G. Lucovsky, Journal Of Non-Crystalline Solids 1987, 97-8, p 839-842) by the chemical vapor deposition technique assisted with a hot filament: HWCVD (for "Hot Wire CVD", e.g. S. C. Saha et al, Thin Solid Films 1999, 337, p 248-252), by a chemical vapor deposition technique assisted by UV photons: UVCVD (for "UV(Hg) Photon Assisted Chemical Vapor Deposition", e.g. M. Petitjean et al, Applied Physics A—Materials Science & Processing, 1992, 54, p 95-99), by the chemical vapor deposition technique at atmospheric pressure: APCVD ("Atmospheric Chemical Vapor Deposition", e.g. B. Mayer, Thin Solid Films 1992, 221 p 166-182), by the low pressure chemical vapor deposition technique: LPCVD ("Low Pressure Chemical Vapor Deposition, e.g. K. Gruter et al, Journal of Crystal Growth 1989 94 p 607-612) or more generally by any technique derived from CVD. For the method for producing boron nitride, it is possible to use as a gas mixture for example ammonia gas bubbled in liquid borazine (T. Wideman et al, Inorganic Chemistry 1995, 34, 1002). For the method for producing carbon, simple hydrocarbons may be used, for example acetylene or methane. For producing materials consisting of a mixture of boron nitride and of carbon, it is possible to use a mixture of the aforementioned gases.

Except at the channels, the remainder of the membrane will preferably be impervious to solutions, so as to channel the diffusion of either one of the solutions depending on the concentration gradient, at the surface of the channels, the walls of which are formed with the selected material.

The walls of the channels or the tubes used may consist of a material selected from boron nitride, carbon doped with boron, boron nitride doped with carbon, or any other mixture of the boron, carbon and nitrogen elements, preferably in crystalline form, with a hexagonal structure, and preferably hexagonal boron nitride. It is said that a material is doped with another element when it contains a minimum of 1 atom of the element corresponding to the assay and up to 50% of atoms of the element corresponding to the assay as compared with the total number of atoms of the material, and preferably up to 10%.

Moreover, a crystalline form with a hexagonal structure is characterized by the presence on its low angle x-ray diffraction spectrum of peaks for which the interplane distance corresponds to the Miller indices (1,0,0), (1,1,0), (2,0,0). Such a spectrum may be obtained on a powder of the material with CuKα radiation ($\lambda$=0.154 nm) over a range of angle $2\theta$, an angle in the range [0.5°-10.0°], for example with 0.1°/min.

Advantageously, the diameter of the channels belongs to the range from 1 to 1,000 nm, and preferably to the range from 10 to 100 nm. In the case when nanotubes are used, this diameter corresponds to the internal diameter of the tubes. Advantageously, the population of channels present on the membrane has rather homogenous diameters, for example, with a variability of less than a 100% as measured between the most spaced apart values, preferably of less than 10%. The channels will for example have a length from 100 to 1,000,000 nm, and preferably from 1,000 to 10,000 nm. The diameter and the length of the channels may be measured by transmission electron microscopy.

Advantageously, the surface area of the membrane should be maximized, and may vary for example between 10 $\mu m^2$ and 10 $m^2$. The surface fraction represented by the channels will preferably be comprised between 1% and 91%. The temperature for applying the method will preferably be equal to room temperature (i.e. comprised between 18 and 25° C.), but may more generally vary from 0 to 100° C. Initially, the solutions used will preferably be at atmospheric pressure, although a pressure of −100 to 100 bars for example may be contemplated. The pressure applied on each of the solutions placed initially, on either side of a membrane, will be identical and will be slowly modified during the period generating a pressure difference between both solutions located on either side of a membrane, because of the diffusion generated by the concentration gradient. The temperatures and pressures of use will of course be limited by the strength of the membrane used.

The solute, the concentration of which varies from one solution to the other, may be found or not as a salt. As an example, mention may be made of solutes with a small size, such as salts of alkaline metals, and notably NaCl or KCl, or sugars. Although this is not mandatory, the solute at the origin of the concentration gradient utilized within the scope of the invention will be of a size so as to be able to pass through the channels. The solutions used may be organic solutions, for example oleic acid, alcohols and derivatives thereof, or preferably aqueous solutions which promote the generation of charges at the surface of the channels. Of course, the most simple and the least expensive solutions will be preferred, so that the solutions used may be seawater or river water, waste waters or industrial wastes. As an example, the solutions initially placed on either side of the membrane will have a concentration difference of at least one solute, corresponding to a ratio of concentration between both solutions from 1 to 100,000 and preferably from 10 to 10,000.

Figure 3:
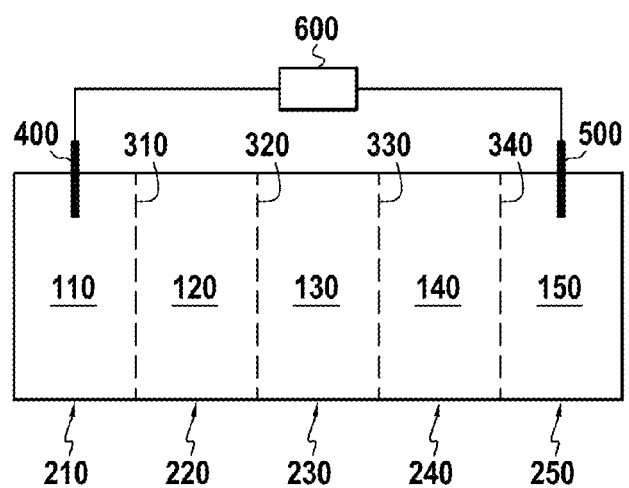

It is possible that the device according to the invention includes a whole series of cells separated by membranes described earlier as illustrated in FIG. 3. The device shown in FIG. 3 includes five cells 201 to 250 respectively including solutions 110 to 150 separated by membranes 310 to 340. The solutions 110 to 150 will be characterized by a concentration gradient of at least one solute. For example, the solution 110 has a concentration of a given solute of less than that of the solution 120 contained in the adjacent cell 220, this concentration being itself less than the concentration of this solute in the solution 130 contained in the adjacent cell 230, this concentration being itself less than the concentration of this solute in the solution 140 contained in the adjacent cell 240, and this concentration being itself less than the concentration of this solute in the solution 150 contained in the adjacent cell 250. Instead of a decreasing gradient from the cell 210 to 250, an increasing gradient may just as well be provided. In the case of the example illustrated in FIG. 3, both electrodes 400 and 500 will be placed in the first solution 110 and the last solution 150 so as to recover a maximum of energy. Other combinations between the concentrations of solute of the compartments and the placement of the electrodes in the compartments may be envisioned. For example, it is not indispensable to provide a continuous concentration gradient between the first and the latter solution, the essential point being that a gradient exists between both solutions separated by a membrane, the current may be recovered every time between two electrodes placed between two successive cells.

The method and the device according to the invention allow generation of electric energy between both electrodes. The electrodes may be in any suitable metal. For example, silver or silver chloride electrodes may be used. The device according to the invention will incorporate any suitable device with which it is possible to recover the generated electric energy. Such a device connected to both electrodes is symbolized by the references 5 and 600 in FIGS. 1 and 3. The electric energy is generated by the diffusion of either one of the solutions due to the existing concentration gradient initially between both solutions. Continuous production of electric energy may be contemplated by renewing at least one of the two solutions, or even both solutions, for example by introducing an inlet and outlet flow in these compartments. This renewal may be accomplished continuously or in a sequenced way and preferably regularly.

The energy obtained is greater than that obtained under the same conditions with the devices described in the literature. When the pH of at least one of the two solutions, or even of both solutions, is greater than or equal to 6, preferably greater than or equal to 7, preferentially greater than or equal to 8, and still preferentially greater than or equal to 10, the amount of generated electric energy is even more substantial.

It was also shown that the beneficial effect obtained with such pH values may be retained for a certain time, for example for 1 to 7 days, even if subsequently the solutions placed on either side of the membrane for generating energy had a pH below these values. Also, according to a particular embodiment, the method according to the invention includes a step for preparing the device carried out with two solutions of different concentration of at least one solute, at least one of the two solutions, or even both solutions, having a pH greater than or equal to 6, preferably greater than or equal to 7, preferentially greater than or equal to 8, and still preferentially greater than or equal to 10. Preferably, both of these solutions are positioned in the device on either side of the membrane for a period from 2 to 10 mins, for example, and then they may be replaced with solutions of lower pH.

The present invention has a most particular interest in the generation of electric energy. As an illustration, it is notably possible to generate within the scope of the invention, energies corresponding to power values of 100 to 1,000 watts per square meter of membrane. The method and the device applied are particularly simple and inexpensive and open new routes in the present problem of renewal energies. The device and the method according to the invention may notably be used for making micro-batteries or micro-generators of energy.

The examples hereafter referring to FIGS. 4 to 7 allow validation of the method and the device according to the invention.

Figure 4:
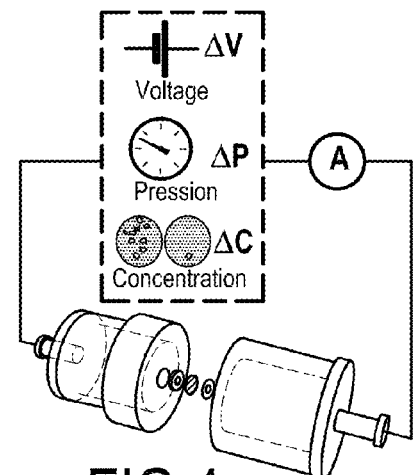

FIG. 4: Schematic illustration of the device used in the different tests.

Figure 5:
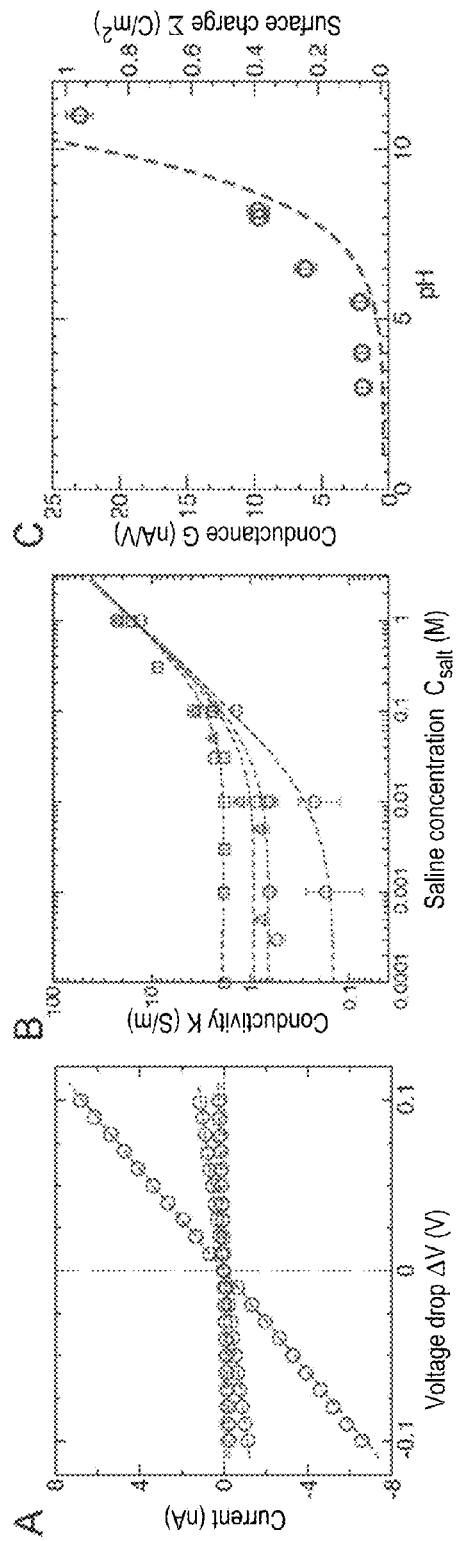

FIG. 5: Electric conductance and chemical reactivity of BNNT—A. Ion current/voltage drop for $C_{salt}$=1M (blue), $10^{-1}$M (violet), $10^{-2}$M (orange), $10^{-3}$M (red) at a pH of 5; t-BNNT with {R,L}={29,900} nm. The dotted lines correspond to linear adjustments, from which the conductance G=I/ΔV and the conductivity K=G×L/NR$^2$ are extracted. B. Conductivity K/saline concentration for different t-BNNTs, with {R,L}={40, 1250}, {29, 900}, {22, 1500}, {15, 800} (from bottom to top) at a pH of 5. The dotted lines correspond to predictions by using equation (1), with Σ=25, 85, 90, 125 mC/m$^2$. C. Dependency of conductance (left axis) on pH for a set $C_{salt}$ of $10^{-2}$M; t-BNNT with {R,L}={29, 900} nm. The surface charge (right axis) inferred from equation (1) increases up to values of ≈1C·m$^{-2}$. The dotted line corresponds to the prediction of the charge regulation model, with pK$_0$≈5.5.

Figure 6:
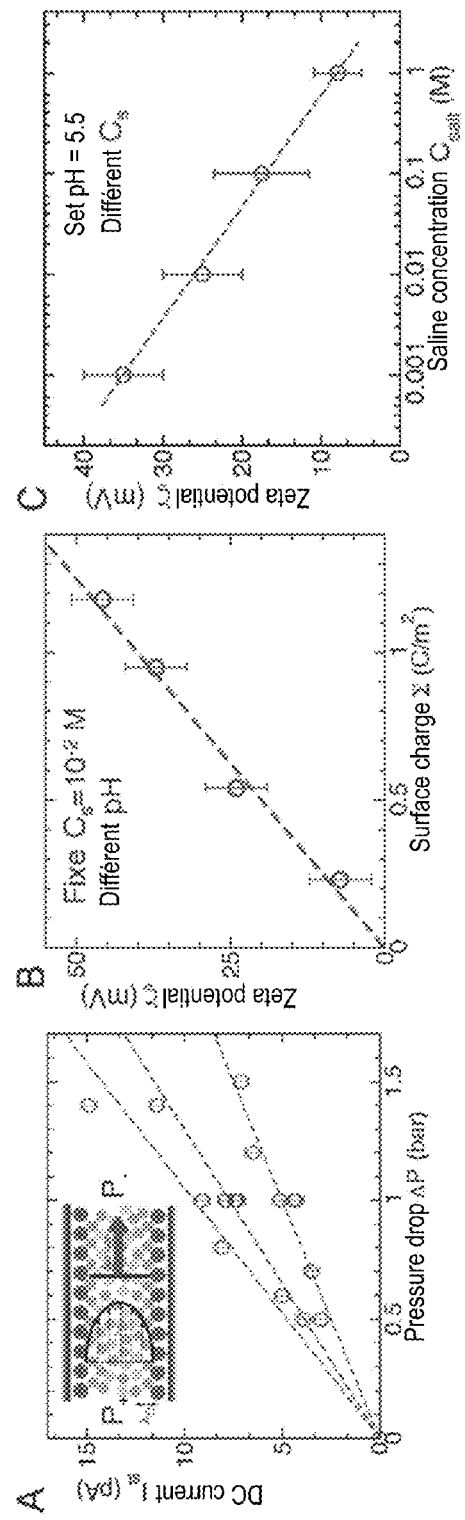

FIG. 6: DC current caused by the pressure. A. DC current induced by a pressure drop: t-BNNT with {R,L}={29, 900} nm for a pH of 7, 8.5 and 10 (from bottom to top) and a set $C_{salt}$ of $10^{-2}$M. Beginning: sample of the DC current caused by pressure. B. Extracted zeta potential/surface charge for a set $C_{salt}$ of $10^{-2}$M, and a pH from 5 to 11.5. The measured surface charge is extracted from equation (1) for each pH. C. Measured zeta potential/saline solution, for a pH of 5.5, for a t-BNNT having a {R,L}={40, 1250} nm.

Figure 7:
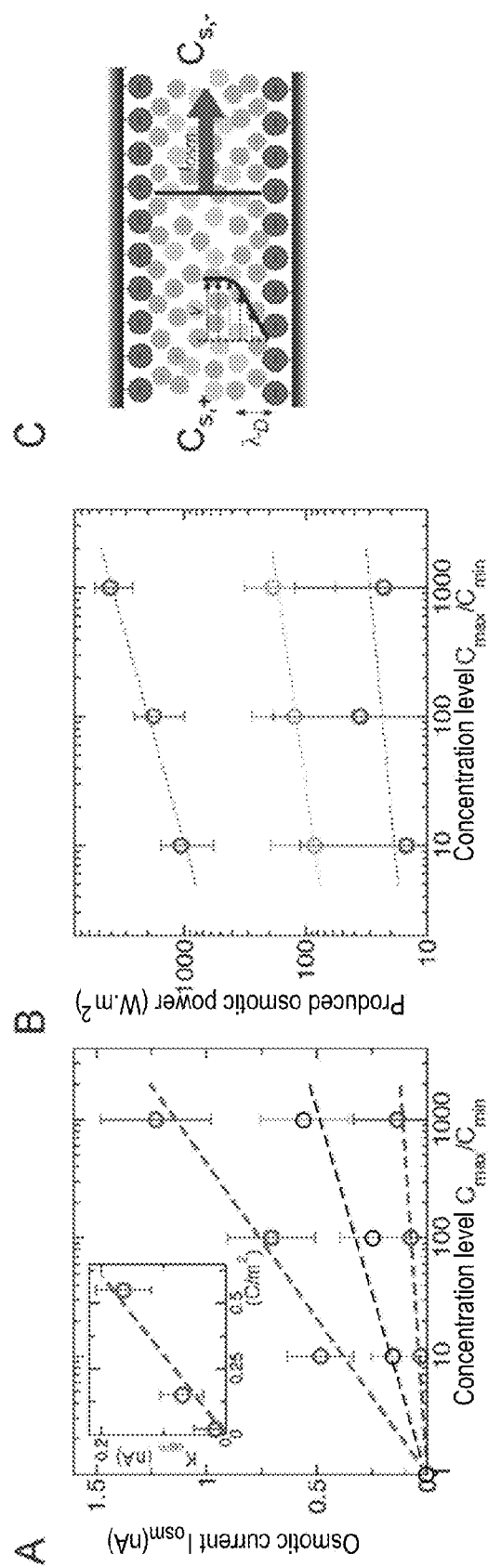

FIG. 7: Osmotic energy generation with salinity gradients. A. Osmotic DC current/concentration difference, for a t-BNNT with {R,L}={40, 1250} nm, for a pH of 5.5, 9.5 and 11 (from bottom to top). The experimental points group measurements with different sets of saline concentrations in both reservoirs, for a $C_{salt}$ from $10^{-3}$M to 1M. The error bars come from the corresponding error analysis. The dotted lines correspond to the linear adjustments $I_{osm}=K_{osm}×\log [C_{max}/C_{min}]$. Insert: osmotic mobility/surface charge. The surface charge is measured from independent conductance measurements. The dotted line corresponds to linear adjustment $K_{osm}≅0.33×Σ$. B. Corresponding power density (per unit surface of BNNT) for the three pHes. The dotted lines are used as a visual guide. On this graph, the minimum concentration is set to $C_{min}=10^{-3}$M. C. Sample of the osmotic DC current.

1. Electric Measurements

The electric measurements are carried out with two Ag/AgCl electrodes integrated to the reservoirs in PEEK. The experimental device is placed in a Faraday cage. The electrodes are silver wires with a diameter of 0.8 mm initially activated by dipping them in NaClO for 30 minutes. The electrodes are then connected to an I/V converter (low pass filter—1 kHz) in series, to an acquisition card (National Instrument), and controlled by a piece of software. The voltage is also adjusted via the acquisition card (output mode) and the piece of software. The resolution with this device is ±1 pA.

2. Preparation of the KCl Solutions Used

KCl solutions at different concentrations, between $10^{-4}$M and 1 Mm, are obtained by dissolving KCl (Roth) in demineralized water. The pH is adjusted by means of HCl (Acros) and KOH (Roth) solutions. The conductivity and the pH of the solution are checked by means of a conductometer (Hanna Instruments) and of a pH-meter (Labomoderne) just before the experiments, and then rechecked. No notable difference was observed. Just before introducing the liquid into the reservoir, degassing is carried out in a desiccator connected to a pump for 20 minutes of boiling.

3. Measurement of Conductance

The conductance is measured by the slope of the I/V curves. The voltage is varied between −1 and 1V, but the conductance measurements result from the current/voltage between −0.1V and 0.1V linear adjustment. For a system with low conductance, capacitive relaxation over a timescale of 100 seconds is observed. The measurement of the current is thus obtained after waiting for 200 s at each voltage, in order to avoid this capacitive effect. For higher concentrations, a wait time of 10 s is sufficient.

In order to guarantee that the measurement actually corresponds to the transport of the ions inside the tube, reference experiments were carried out. First of all, conductance measurements of a membrane without any hole and of a clogged tube were conducted. A residual conductance of 0.1 nS is observed in both cases, and is less than the lowest conductance measured for the tube. Further, within the scope of these reference experiments, this residual conductance does not depend on the salt concentration. The lower limiting value for conductance measurements is thus 0.1 nS. A sharp difference is observed with an open tube, with which a dependency on the concentration of salt is clearly observed for saline concentrations above $10^{-2}$M. Another proof of fluidic transport inside the tube is provided by MET imaging after the fluidic measurements. The images clearly show that the tube is full of salt.

4. Conducted Tests

The transport properties of a fluid inside a single tube of boron nitride with an internal diameter of a nanometric size were studied, in a perspective of generating renewable energy. The nano-fluidic device used consists of a single boron nitride nanotube positioned within an impervious solid membrane which connects two reservoirs (FIG. 4). The fluid transport in the transmembrane boron nitride nanotube (noted as t-BNNT) was studied under electric constraints, pressure constraints and chemical constraints and combinations of the latter. The device t-BNNT consists of a single boron nitride nanotube inserted into an orifice made in a silicon nitride (SiN) membrane. A single orifice, having a diameter from 100 to 200 nm, was pierced in the membrane by means of a focussed ion beam (FIB). A multi-walled BNNT was stuck to the end of an electrochemically etched tungsten tip, and its apex was opened by ionic desorption methods via an electric field. The insertion of the nanotube into the orifice was achieved in situ by means of a nanomanipulation with a scanning electron microscope (SEM), with nanometric resolution. As soon as the tube was introduced, the orifice was closed around the external walls of the tube by locally depositing naphthalene induced by an electron beam (EBID). The end was then retracted, thereby causing telescopic sliding of the internal walls of the nanotube. This step gives the possibility of guaranteeing that the nanotube has its two ends well open, and thus preventing any interior defect in the channel. Final inspection with a transmission electron microscope (TEM) gave the possibility of checking and measuring the quality and the interior diameter of the nanotube. Tubes having an interior radius R≈15 to 40 nm and length L≈1 μm were studied.

The membrane crossed by the boron nitride tube was then placed between two reservoirs of fluid containing potassium chloride (KCl) solutions at different concentrations with a controlled pH.

The membrane of 7.5 mm×7.5 mm, with its boron nitride tube crossing it, was then compressed between two reservoirs which consists of 2 cm³ PEEK chambers. The compression is ensured by a third part which pushes the upper chamber by means of a screw, towards the lower chamber, while guaranteeing a parallel contact during the sealing. The sealing was carried out via two O-rings, directly on the membrane. Before each insertion of the experimental device, extensive cleaning of the chambers and of the O-rings is carried out with soap (MicroSon, Fiszcher Scientific), and 15 minutes of ultrasounds at 60° C., and then by rinsing the whole with demineralized water (Millipore). A Teflon clamp was used in order to avoid any scratching and any risk of a leak on the chamber.

Ag/AgCl electrodes were used for measuring the electric current which passes into the boron nitride tube which crosses the membrane, with a resolution of the order of several pico-amperes. Reference measurements of the electric conductance were carried out in order to validate each step of the manufacturing procedure. The integrity of the nanotube which crosses the membrane was further checked after use by means of a TEM.

Although the purpose of the device relates to osmotic transport in the individual BNNT with a salinity gradient, first studies dealt with the characterization of its response to voltage and pressure differences, which provide essential information on the surface properties of the BNNT. Therefore, the ionic current I generated in the t-BNNT, in the case of an electric potential difference ΔV was first of all measured versus the saline concentration (FIG. 5). The electric conductance G=I/ΔV and the corresponding conductivity K defined as $$G = K \times \frac{\pi R^2}{L}$$

were computed as a function of the saline concentration (FIG. 5). For a given tube, such a curve has a saturation of the conductance at a low saline concentration. This observation is characteristic of a confined charged surface (D. Stein, M. Kruithof, C. Dekker, Surface Charge governed ion transport in nanofluidic channels, Phys. Rev. Lett. 93, 035901 (2004)), which has a strong contrast with the behaviour reported for carbon nanotubes (H. Liu, et al., translocation of single stranded DNA through single-walled carbon nanotubes Science 327 64-67 (2010)). The predicted conductance is (L. Bocquet, E. Charlaix, Nanofluidics, from bulk to interfaces, Chem. Soc. Rev., 39, 1073-1095 (2010)):

$$G = 2e^2 \mu C_s \frac{\pi R^2}{L} + e\mu \frac{2\pi R}{L} \times |\Sigma|(1 + \alpha)$$

wherein $C_s$ corresponds to the KCl concentration, e corresponds to the electron charge, $\mu = \frac{1}{2}(\mu_{K+} + \mu_{Cl-}) = 4.8 \cdot 10^{11}$ s·kg$^{-1}$ corresponds to the mobility of KCl, and Σ corresponds to the surface charge density at the surface of the boron nitride (in C/m²); the correction $\alpha = (2\pi l_B \mu \eta)^{-1} \sim 1$ explains the electro-osmotic contribution to the conductance ($L_B$=0.7 nm=Bjerrum length, and η=viscosity of the water).

It appears that with a low pH (pH≈5 in FIG. 5A-B), the extracted surface charge slightly increases when the diameter of the tube decreases, with a typical value of Σ≈0.1 C/m² (FIG. 5B). Although this surface charge is already removed, a significant and reversible increase was seen with the pH of this charge, with a value of Σ which increases up to 1 C/m² for a pH of about 11 (FIG. 5C), which corresponds to 9 e/nm² at the surface of the boron nitride. This exceeds the conventional surface charge densities by at least one order of magnitude (R. J. Hunter *Foundations of Colloid Science* (Oxford Univ. Press, New York, 1991)) and would therefore reproduce the dependency on pH of the charge (FIG. 5C), while providing a value of $pK_\alpha$≈5.5 for the equilibrium constant (with an identified density of chargeable sites like the surface density of the boron in BNNT, i.e. $\Gamma=18$ nm$^{-2}$).

The response of the confined fluid, in response to a pressure drop within the t-BNNT provides another sensitive measurement which allows evaluation of the fluid/ion dynamics.

For this, on one of the two reservoirs, a connection is established between the closed reservoir and a pipe connected through air to a voltage-controlled pressure regulator (SMC Corp.). The leak proof accessible pressure (controlled with a manometer) varies between zero and two bars, with an accuracy of 50 mbars. The pressure regulator is connected via filters from SMS Corp. in order to guarantee good quality of the air. The experiments were carried out as follows: the voltage is adjusted by means of a zero pressure difference until stabilization of the current. Next, pressure variations are produced via the regulator, and the current difference is recorded.

By transporting the ions in the double electric layer, a DC electric current of a few pico-amperes is generated by the flow driven by the pressure (FIG. 6). This provides a measurement of the electro-osmotic mobility and of the corresponding zeta potential, $\zeta$ defined here by Smoluchowski's relationship $$I_{stream} = -\frac{\varepsilon \zeta}{\eta} A \frac{\Delta P}{L}$$

($\varepsilon$=dielectric permittivity of water, $\lambda=\pi R^2$) (R. J. Hunter Foundations of Colloid Science (Oxford Univ. Press, New York, 1991)). A pressure drop of 1.5 bars was then applied between the two reservoirs of fluid via a voltage-controlled valve, and the resulting electric current $I_{stream}$ ($\Delta P$) was measured (FIG. 6A). It was observed, like the surface charge $\Sigma$ that the corresponding zeta potential increases with the pH (see FIG. 6B), and is quasi proportional to the surface charge $\Sigma$, measured independently. It also slowly decreases with the saline concentration, which varies linearly with $pC_{salt}=-\log_{10} C_{salt}$ (FIG. 6C). Globally, the obtained zeta potential value is much less than the estimated surface potential, such as for example the one computed from the non-linear Poisson-Boltzmann equation. These first measurements emphasize the presence of an enormous surface charge $\Sigma$ sensitive to the pH and borne by the interior walls of the BNNTs. It would seem that no value of $\Sigma$ of 1 C·m$^{-2}$ has been reported to this day in the literature.

It was then demonstrated that this exceptional property has a significant impact on osmotic transport in the nanotube, generating an electric current by a saline concentration difference. This property may advantageously be utilized in energy conversion from mixtures of waters having different salinities.

For this, different KCl concentrations of the order of 10$^{-3}$ to 1M in both reservoirs were used. The resulting electric current was measured for a large number of concentration ratios, $C_{s,I}/C_{s,II}$.

All the measurements were carried out at a pH of 10. The conductance $G_{ion}$ was measured by voltage variations of the order of −0.1V to 0.1V, and the desired current was obtained by the intersection of the curve for $\Delta V=0$. The order of magnitude of this current is of a few nano-amperes.

In order to extract the osmotic contribution to the relevant current, it was however necessary to subtract the contribution due to the Nernst potential of the redox pair on the electrodes (D-K Kim, C. Duan, Y-F. Chen, A. Majumdar Power generation from concentration gradient by reverse electrodialysis in ion-selective nanochannels Microfluid Nanofluid 9, 1215-1224 (2010)). In fact, an uneven chloride concentration at both electrodes generates a given redox potential by the expression: $\Delta E_{redox}=k_B T/e \times \log(\gamma_I C_I/\gamma_{II} C_{II})$ with gamma which corresponds to the average activity coefficients of the ions. In order to obtain the osmotic contribution, the current associated with the redox potential is subtracted by means of the conductance: $I_{OD}=I_{measured}-G_{measured}E_{redox}$.

The obtained current was therefore corrected from the contribution which results from the Nernst potential due to the saline concentration difference at both electrodes (D-K Kim, C. Duan, Y-F. Chen, A. Majumdar Power generation from concentration gradient by reverse electrodialysis in ion-selective nanochannels Microfluid Nanofluid 9, 1215-1224 (2010)). As this is illustrated in FIG. 7A, a very high osmotic current was measured, of the order of several nano-amperes, as compared with the DC current of several pico-amperes generated by a difference of pressures (FIG. 6). It was observed that the latter also increases depending on the salinity level, $$I_{osm}=K_{osm} \times \log[C_{max}/C_{min}]$$

with the transport coefficient $K_{osm} \approx 0.07-0.16$ nA for the nanotube in FIG. 7, for a pH from 5.5 to 11, and quasi proportional to the surface charge $\Sigma$ (FIG. 7A—beginning). Given that in the configuration illustrated in FIG. 7A, the nanotube is not selective towards the ions (given that no overlap of Debye layers occurs here), the origin of the produced current differs from the conventional mechanisms selective to the ions which are taken into account for the osmotic generation of energy (called reverse electrodialysis), and which use exchange membranes for converting the salinity gradient into electric energy (B. E. Logan and M. Elimelech, Membrane-based processes for sustainable power generation using water, Nature, 488, 313-319 (2012) and D-K Kim, C. Duan, Y-F. Chen, A. Majumdar Power generation from concentration gradient by reverse electrodialysis in ion-selective nanochannels Microfluid Nanofluid 9, 1215-1224 (2010)). It may be assumed that in the present case, the generated osmotic current rather results from the osmotic flow induced by the saline concentration difference at the interior interface of the tube. Although no global osmotic pressure drop occurs in this pervious configuration, the saline concentration difference generates an osmotic pressure gradient in the diffuse layer at the interfaces (FIG. 7C).

Boron nitride may behave like a confining material, for which the enormous surface charge generates much more osmotic current than the other materials. Further, the measured osmotic current is much greater than the DC current caused by the pressure illustrated in FIG. 6A. This is due to the concerted contribution of different factors. First of all, because of the different microscopic origin of both phenomena, the osmotic mobility is much more sensitive to high surface charges than its electro-osmotic counterpart. Next, this quantitative difference also stems from the much more significant osmotic pressure drop which exists inside the double layer for the osmotic phenomenon (generally, $\Delta P_{osm} \sim 50$ bars for $\Delta C_{salt}=1$M, as compared with the applicable range of pressures with the flows caused by the pressure, $\Delta P_{osm}$, of at most a few bars).

The t-BNNT thus converts electric energy from a salinity gradient. The corresponding maximum power generated by the salinity gradient is $P_{max}=I_{osm}^2/4G_{ion}=K_{osm}^2/4G_{ion} \times (\Delta \log[C_s])^2$ which causes a power density per unit surface of the tube $P_{unit\ surface} = P_{max}/\pi R^2$ which may attain 4,000 W·m$^{-2}$ for the single boron nitride nanotube (FIG. 7B). In the same way, this result obtained by a single nanotube may be extrapolated to a macroscopic boron nitride membrane (M. Bechelany, et al. Synthesis of Boron Nitride Nanotubes by a Template-Assisted Polymer Thermolysis Process J. Phys. Chem. C, 111, 13378-13384 (2007)), with a similar BNNT density equal to about $10^{10}$ cm$^{-2}$, for which the predicted power density attains similar values in kW/m$^2$. These values exceed by several orders of magnitude the reported power densities, generally of a few tens of W/m$^2$, by means of a conventional reverse electrodialysis with other exchange membranes (B. E. Logan and M. Elimelech, membrane-based processes for sustainable power generation using water, Nature, 488, 313-319 (2012)). The obtained results thus demonstrate the impressive performances of the BNNT membranes for converting energy from the mixture of water with different salinities, potentially superior to photovoltaic.

The invention claimed is:

1. A device for producing electrical energy, the device comprising:
    a first cell and a second cell for configured to receive, respectively, a first solution and a second solution having different concentrations of at least one solute;
    said first cell and said second cell being separated by at least one separation membrane having a plurality of channels extending therethrough;
    a first electrode disposed in said first cell, said first electrode being configured to contact said first solution;
    a second electrode disposed in said second cell, said second electrode being configured to contact said second solution; and
    a unit connected to said first electrode and to said second electrode, said unit being configured to recover electrical energy generated by the device;
    wherein walls of the plurality of channels comprise a material selected from the group consisting of boron nitride, carbon doped with boron, boron nitride doped with carbon, and a mixture thereof.

2. The device according to claim 1, wherein the walls of the channels comprise a crystalline material of hexagonal structure.

3. The device according to claim 2, wherein the crystalline material is hexagonal boron nitride.

4. The device according to claim 1, wherein a diameter of the plurality of channels is in a range of from 1 to 1000 nm.

5. The device according to claim 4, wherein the diameter is in a range of from 10 to 100 nm.

6. The device according to claim 1, wherein the plurality of channels is delimited by tubes of the material.

7. A method for producing electric energy, the method comprising:
    providing a device comprising a first cell and a second cell configured to receive, respectively, a first solution and a second solution having different concentrations of at least one solute; said first cell and said second cell being separated by at least one separation membrane having a plurality of channels extending therethrough; a first electrode disposed in said first cell, said first electrode being configured to contact said first solution; and a second electrode disposed in said second cell, said second electrode being configured to contact said second solution; and wherein walls of the plurality of channels comprise a material selected from the group consisting of boron nitride, carbon doped with boron, boron nitride doped with carbon, and a mixture thereof;
    placing the first solution in the first cell so that the first electrode is in contact with the first solution;
    placing the second solution, having a concentration of at least one solute different from that of the first solution, in the second cell, so that the second electrode is in contact with the second solution; and
    recovering electrical energy produced between said first electrode and said second electrode.

8. The method according to claim 7, wherein said solute is a salt.

9. The method according to claim 7, wherein each of said first solution and said second solution is an aqueous solution.

10. The method according to claim 7, wherein said first solution and said second solution is seawater or river water.

11. The method according to claim 7, wherein at least one of said first solution and said second solution has a pH selected from the group consisting of:
    a pH that is greater than, or equal to, 6;
    a pH that is greater than, or equal to, 7;
    a pH that is greater than, or equal to, 8; and
    a pH that is greater than, or equal to, 10.

12. The method according to claim 7, wherein a concentration of said first solute in said first solution is different from a concentration of said second solute in said second solution.

13. The method according to claim 7, wherein a continuous production of electric energy is ensured by renewing at least one of said first solution and said second solution.

14. The method according to claim 7, wherein the walls of the channels comprise a crystalline material of hexagonal structure.

15. The method according to claim 14, wherein the crystalline material is hexagonal boron nitride.

16. The method according to claim 7, wherein a diameter of the plurality of channels is in a range of from 1 to 1000 nm.

17. The method according to claim 7, wherein a diameter of the plurality of channels is in a range of from 10 to 100 nm.

18. The method according to claim 7, wherein the plurality of channels is delimited by tubes of the material.

19. The method according to claim 7, further comprising providing the device with a unit connected to said first electrode and to said second electrode, said unit being configured to recover electrical energy generated by the device.

20. The method according to claim 7, comprising using two solutions of different concentration of at least one solute, and wherein at least one of the two solutions has a pH selected from the group consisting of:
    a pH that is greater than, or equal to, 6;
    a pH that is greater than, or equal to, 7;
    a pH that is greater than, or equal to, 8; and
    a pH that is greater than, or equal to, 10.

* * * * *